United States Patent [19]

Spinelli et al.

[11] Patent Number: 5,040,182
[45] Date of Patent: Aug. 13, 1991

[54] MODE-LOCKED LASER

[75] Inventors: Luis A. Spinelli, Sunnyvale; Gilles A. Feugnet, Mountain View; Bernard J. Couillaud, Palo Alto, all of Calif.

[73] Assignee: Coherent, Inc., Palo Alto, Calif.

[21] Appl. No.: 513,798

[22] Filed: Apr. 24, 1990

[51] Int. Cl.$^5$ .............................................. H01S 3/098
[52] U.S. Cl. ..................................... 372/18; 372/97; 372/25
[58] Field of Search ....................... 372/24, 18, 25, 97, 372/14

[56] References Cited

U.S. PATENT DOCUMENTS

| 3,504,299 | 3/1970 | Fox | 372/97 |
| 3,559,102 | 1/1971 | Ueki | 372/18 |
| 3,651,424 | 3/1972 | Ueno et al. | 372/18 |
| 3,725,812 | 4/1973 | Scott | 372/97 |
| 3,879,686 | 4/1975 | Milam et al. | 372/25 |
| 4,174,504 | 11/1979 | Chenausky | 372/97 |
| 4,302,730 | 11/1981 | Jernigan | 372/97 |

OTHER PUBLICATIONS

"Phase Locking of Laser Modes by Continuous Cavity Length Variation", P. W. Smith, Applied Physics Letters, vol. 10, No. 2, Jan. 15, 1967.
"Ti:sapphire Laser Emits ps Pulses", Brian Dance, Laser Focus, Jan. 1990.
"Mode Locking of a Continuous-Wave Titanium-Doped Sapphire Laser Using a Linear External Cavity", French et al., Optics Letters, vol. 15, No. 7, received Oct. 27, 1989, published Apr. 1, 1990.

Primary Examiner—Frank Gonzalez
Assistant Examiner—Susan S. Morse
Attorney, Agent, or Firm—Limbach, Limbach & Sutton

[57] ABSTRACT

Mode-locked pulsed output is induced in a laser by introducing a varying frequency dependent loss in the cavity. The varying, frequency dependent loss allows a large number of longitudinal modes to oscillate. In one of the preferred embodiments of the subject invention, the varying frequency dependent loss is generated by reciprocating one of the mirrors of the resonator. In this embodiment, the laser has a resonator with a primary light path defined by first and second end mirrors. A gain medium is located between the end mirrors. A beam splitter is provided for redirecting the light into a secondary light path. A third mirror functions to feed back the light into the primary light path. Pulse formation is induced by varying the path length of one of the two paths by reciprocating an end mirror. Moving the mirror creates varying interference effects when the light energy is recombined at the beam splitter. The mirror is reciprocated relatively slowly, yet ultra-short pulses are generated.

41 Claims, 2 Drawing Sheets

MODE-LOCKED LASER

TECHNICAL FIELD

The subject invention relates to a mode-locked laser for generating ultra-short pulses. The subject design is particularly advantageous since it is much simpler and less expensive than prior art configurations.

BACKGROUND OF THE INVENTION

In a mode-locked laser, all of the longitudinal modes which are oscillating within the resonator have a common phase relationship. This common phase relationship is necessary to produce very short pulsed output. Since there is a great interest in performing experiments with very short pulses, much effort has been expended in developing schemes for locking the modes in lasers.

At present, there are four known viable approaches for creating mode-locked pulses. The first approach is active mode-locking and requires the insertion of an optical modulator within the laser cavity. In a second and related approach, a laser cavity is synchronously pumped by a separate laser which is itself actively mode-locked. In both cases, an expensive, high stability RF driver is required.

The third approach found in the prior art is passive mode-locking. In this approach, a saturable absorber is placed in the resonant cavity. This approach is cumbersome since the saturable absorber, usually a dye, must be continuously replaced. Another drawback with the passive mode-locking approach is that the laser is tunable only over a narrow range.

Most recently, a scheme has been developed a scheme to couple a principle resonator with an external resonator having a non-linear material therein. This approach is known as additive pulse mode-locking or APM. This approach does not require any RF driver or saturable absorber. However, it is critically dependant on the operating parameters and is therefore difficult to control. Accordingly, it would be desirable to develop a laser system which can be mode-locked without expensive accessories and in a simple manner.

SUMMARY OF THE INVENTION

The subject invention provides a laser system which can generate mode-locked pulses in the picosecond regime or shorter without expensive accessories. To achieve this result, a varying, frequency dependent loss is introduced into the laser cavity. The variance is achieved by continuously scanning the loss across the oscillating longitudinal modes in the cavity. The result of the scanned loss is to sequentially suppress oscillation of the modes as they become affected by the loss. This action functions to destabilize the laser and prevent any one mode from dominating such that many modes will oscillate. By forcing the laser to operate in many modes, short pulsed output can be generated.

There are a number of approaches which could be used to introduce a frequency dependent loss into the cavity. For example, the transmission of an etalon varies with frequency. Thus, the peak of the transmission of the etalon can be varied in a manner to introduce a scanned frequency dependant loss.

In some of the preferred embodiments discussed below, the frequency dependent loss is generated by the interference effects created by a Michelson interferometer geometry. These interference effects are created when some of the light in the resonator is redirected into a secondary light path and then fed back into the primary light path of the resonator. It has been found that when the length of either of these two paths is varied at a relatively slow rate, mode-locked laser pulses will be generated.

The use of the interferometer geometry includes a resonant cavity having a primary light path bounded by first and second mirrors. A gain medium is located in the resonant cavity. A means is provided for redirecting a portion of the laser light out of the primary light path and into a secondary light path. This redirected light is then fed back into the primary light path by a third mirror.

In accordance with the subject invention, mode-locked pulses are generated by varying one of the two light paths. In one of the illustrated embodiments, the path length is varied by reciprocating one of the end mirrors. The velocity of the mirror is on the order of a few millimeters per second. The oscillation frequency of the mirror is relatively slow, on the order of 1 KHz to 1 MHz. Nonetheless, this slow frequency oscillation has been shown to give rise to mode-locked pulses having a duration in the picosecond regime.

In some of the preferred embodiments of the subject invention, the means for redirecting the light out of the primary path is defined by a partially transmitting beam splitter. This beam splitter is oriented such that a portion of the light will be redirected along the secondary light path while the remainder of the light energy will travel to and be reflected back by the second mirror. The light travelling along these two paths will recombine at the beam splitter and create interference effects. This geometry is effectively a Michelson interferometer.

At the present time, two types of Michelson interferometer geometries have been tested. In the first, the path length between the second mirror and the beam splitter is substantially, but not exactly equal to the path length between the third mirror and the beam splitter. In addition, these path lengths are relatively short compared to the overall length of the cavity. In the second geometry, the path length between the second mirror and the beam splitter is substantially, but not exactly equal to the path length between the first mirror and the beam splitter plus twice the path length between the beam splitter and the third mirror. In the preferred embodiment, a phase-locked feedback loop is utilized to improve performance.

There has been at least one report in the prior literature where mode-locking behavior was induced by the movement of a resonator mirror. (See, "Phase Locking of Laser Modes by Continuous Cavity Length Variation," by P. W. Smith, Applied Physics Letters, Vol. 10, No. 2, Jan. 15, 1967). In the latter experiment, one of the end mirrors of the laser resonator was linearly translated changing the length of the resonator. By changing the length of the resonator, the frequency of the oscillating modes is swept under the fixed gain curve of the laser. This approach will result in individual modes experiencing different gain as the mirror is scanned. This variation can give rise to mode-locking in a manner analogous to the subject invention.

While there is an analogy between the subject invention and the prior art approach, there a number of actual and practical differences. The fundamental difference is that in the approach disclosed by Smith, the gain curve is fixed and the modes of the laser are scanned. The scanning of the modes requires that the movement of the mirror must be over a distance many times $\lambda/2$. It would not be possible to scan a mirror over such a large distance fast enough to generate a continuous train of pulses having a duration in the picosecond regime.

In contrast, in the subject invention, the frequency dependent losses are introduced into the resonator and scanned across the oscillating modes. As noted above, these losses can be introduced without scanning a mirror. However, even where a scanned mirror is used, the distance of travel of the mirror is very small, (ie. less than one wavelength) as compared to the large distances the mirror must be translated in the approach described in Smith. Since the distance travelled is very short, it is possible to scan the mirror at a frequency that will allow generation of continuous mode-locked pulses in the picosecond regime.

Further objects and advantages of the subject invention will become apparent based on the following detailed description, taken in conjunction with the drawings in which:

DETAILED DESCRIPTION OF THE PREFERRED EMBODIMENTS

Figure 1:
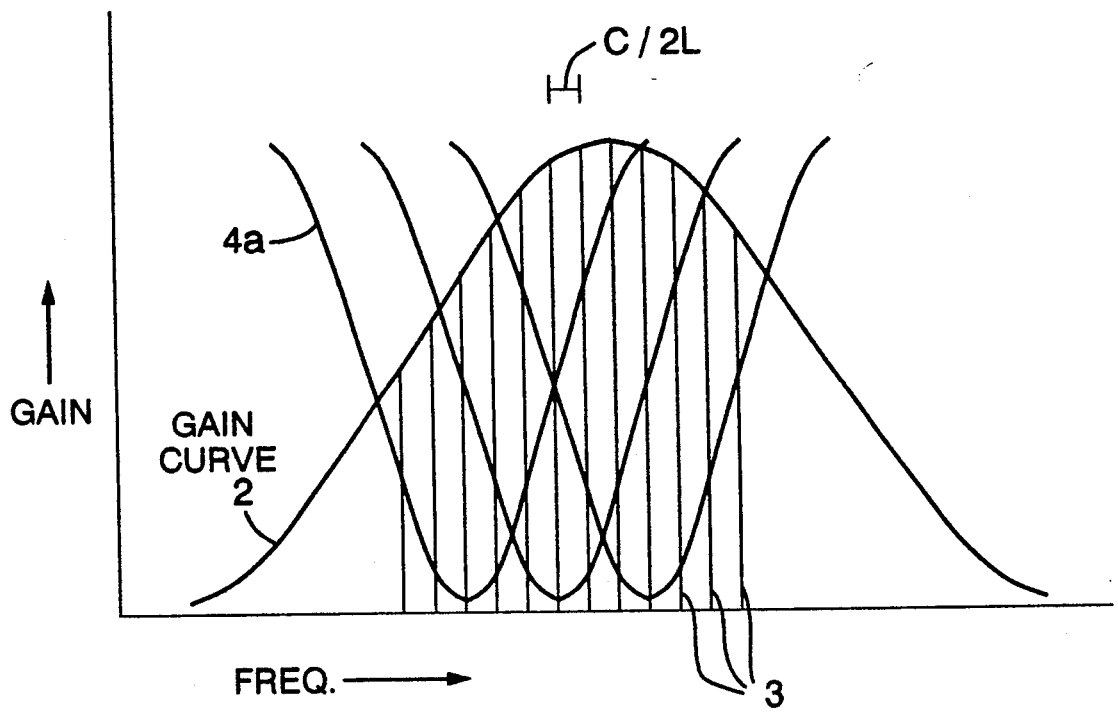
FIG. 1 is a graph illustrating the relationship between the gain curve in the laser and the varying frequency dependent losses introduced in the method of the subject invention.

FIG. 1 illustrates a typical gain curve 2 in a laser. Within this gain curve, there are a number of discrete, closely spaced longitudinal modes 3 which can oscillate. The spacing between the modes 3 is dependent on the length L of the resonator and is given by c/2L where c is the speed of light. In a homogeneously broadened, continuous wave laser, mode competition will cause the laser to oscillate in only a few of the possible modes. In order to obtain short pulses, a number of modes, having a spread of frequencies, must be made to oscillate. In addition, all of these oscillating modes must have a common phase relationship.

In an active mode-locking system, the gain in the cavity is rapidly modulated at a frequency on the order of 10 to 100 MHz which corresponds to the round trip time of light in the cavity. In the subject approach, a loss is introduced into the cavity which is scanned across the gain curve at a much slower rate. Mode-locking behavior generated in accordance with the subject invention has been observed at scanning frequencies as low as a few hundred Hz. The preferred oscillation frequency appears to lie between 1 KHz and 1 MHz.

The effect of such a frequency varying loss can be observed in FIG. 1. Curve 4a represents a window of loss introduced into the cavity. Curves 4b and 4c represent the same window of loss as it is scanned through the frequencies under the gain curve. As can be seen, as the loss curve 4 is scanned, the longitudinal modes 3 will be subjected to varying losses. These varying losses prevents the output from stabilizing on a few modes and allows a much larger number of modes to oscillate. The large bandwidth covered by these multiple oscillating modes permits short pulse operation to be achieved.

There are a number of approaches that may be used to introduce a varying, frequency dependent loss into the cavity. One approach is shown in FIG. 2.

Figure 2:
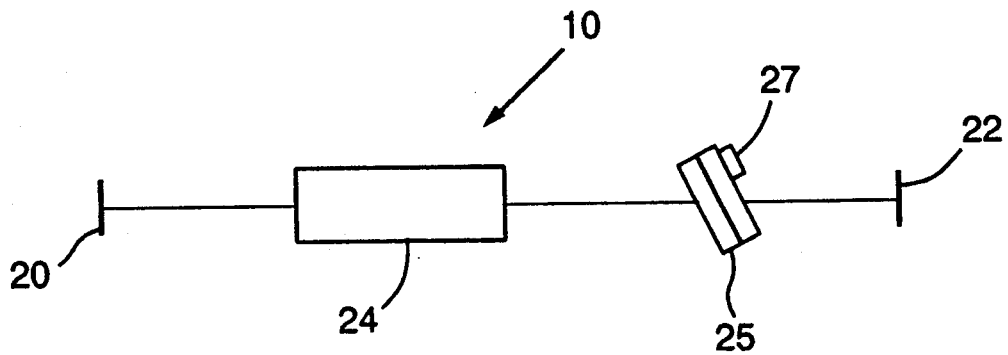
FIG. 2 is a schematic diagram of a mode-locked laser of the subject invention utilizing an etalon to introduce the varying frequency dependent losses in the laser cavity.

In FIG. 2, a laser 10 is shown having a resonant cavity defined between a pair of mirrors, 20 and 22. A gain medium 24 is located within the resonator. A means (not shown) is provided to continuously pump the gain medium.

In this embodiment, the means for introducing a loss is defined by an etalon 25. The use of etalons to produce single frequency output in a laser is well known. Briefly, interference effects in the etalon are created which allow transmission of a selected wavelength while blocking other wavelengths by destructive interference. Air spaced etalons are available where the peak of the transmission curve of the etalon can be rapidly adjusted by varying the space between the etalon members with a PZT 27. Suitable etalons and a PZT drive are described in U.S. Pat. Nos. 4,081,760 and 4,097,818 incorporated herein by reference.

To implement the subject invention, the PZT 27 needs to be driven so that the losses of the etalon are scanned through the gain curve of the laser. As noted above, the PZT is preferably driven at a frequency of 1 KHz to 1 MHz.

Other types of adjustable etalons are available which might be used to implement the subject invention. For example, the transmission curve of a solid etalon can be adjusted by tipping the etalon with respect to the beam. In the latter case, a means would be provided for reciprocating the etalon about an axis to scan a window of loss in the cavity.

Other intracavity elements can be used to vary the frequency dependent loss in the cavity. For example, it is known that a birefringent element can be rotated to scan a window of loss with respect to frequency. It would be possible to provide a means to reciprocally rotate a birefringent element to create the necessary frequency dependant losses to generate mode-locked pulses.

Figure 3:
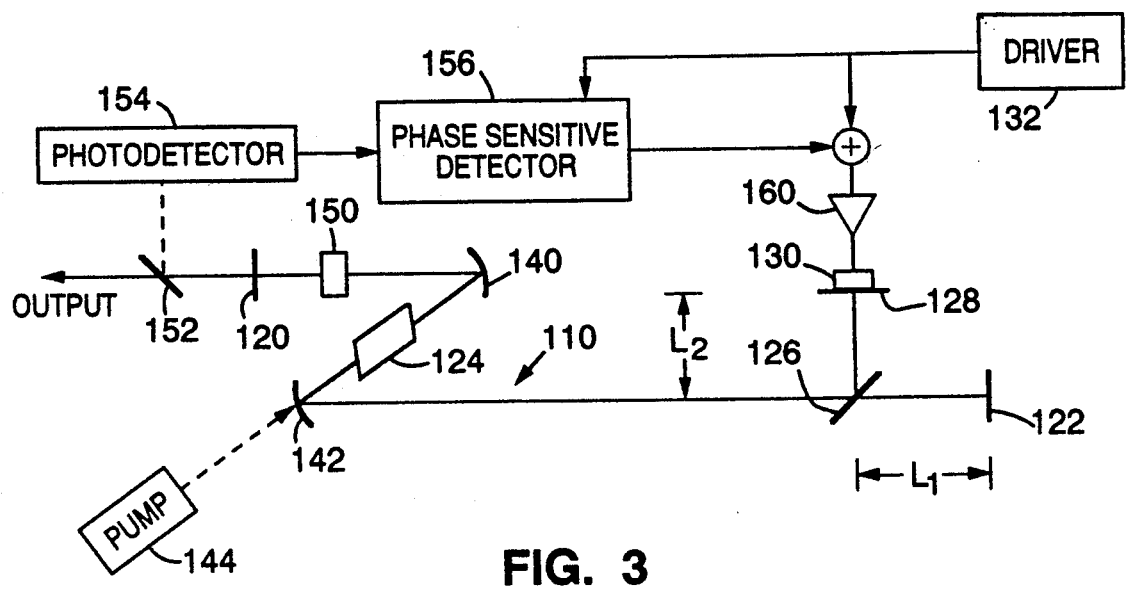
FIG. 3 is a schematic diagram of a mode-locked laser of the subject invention having a short Michelson interferometer geometry.
Figure 4:
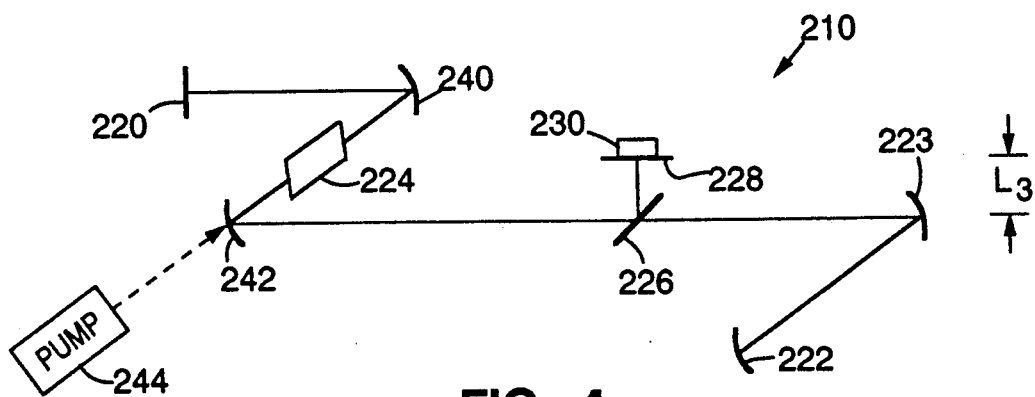
FIG. 4 is a schematic diagram of a mode-locked laser of the subject invention having a long Michelson interferometer geometry.
Figure 5:
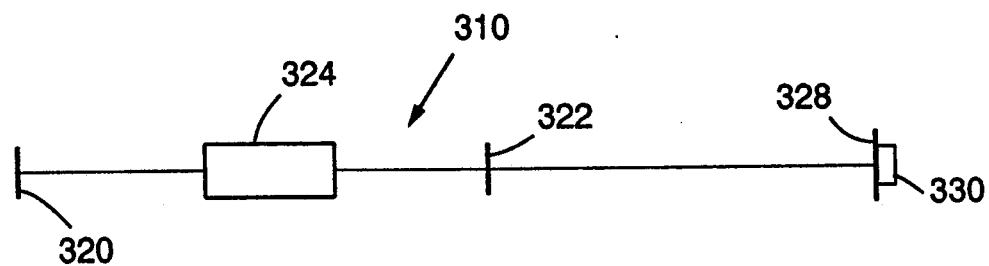
FIG. 5 is a schematic diagram of another configuration of a mode-locked laser formed in accordance with the subject invention.

FIGS. 3 through 5 illustrate another approach for introducing a varying, frequency dependent loss. In each of the approaches shown in these figures, interference effects are relied upon to introduce the necessary losses in the cavity. The scanning effect is created when one of the mirrors of the resonator is reciprocated.

Turning first to FIG. 3, there is illustrated a schematic diagram of a laser 110 for generating mode-locked pulses. The laser 110 has a resonant cavity having a primary light path extending between a first mirror 120 and a second mirror 122. A gain medium 124 is located within the resonator. Preferably, a means (not shown) is provided to continuously pump the gain medium.

In accordance with the subject invention, a means is provided for redirecting the laser light out of the primary light path and into a secondary light path. In the illustrated embodiment, this means is defined by a partially reflecting beam splitter 126. This beam splitter may have a transmission/reflectivity ratio of 50:50 but other ratios have been shown to work. The other end of the secondary light path is defined by a third mirror 128. Third mirror 128 functions to redirect the light back into the primary beam path.

In operation, a portion of the light energy travelling from the gain medium 124 will travel through the beam splitter 126 and be reflected back by mirror 122. As noted above, the remaining portion of the light will travel along the secondary light path up to and back from mirror 128. When the light energy returns from both paths, it will recombine and create interference effects. This geometry follows the structure of a Michelson interferometer. A laser set up with this geometry will generate a CW output.

In accordance with the subject invention, in order to generate mode-locked pulses, the path length of one of the two paths needs to be varied. In this embodiment, this result is achieved by reciprocating one of the end mirrors via a PZT crystal 130 attached to the third mirror 128. The PZT crystal is driven by an oscillator 132. As discussed above, oscillator 132 can operate at a relatively low frequency, between 1 KHZ and 1 MHz.

The length of travel of the mirror is dependent on the wavelength of the laser light. It has been found that the total path length change must be between 0.1 and 0.5 times the wavelength of the light to obtain a continuous train of pulses. Since in this arrangement, the path length change is twice the length of travel of the mirror, that length change should be between 0.05 and 0.25 times the wavelength. The velocity of a mirror travelling this distance with the desired frequency is on the order of a few millimeters per second.

The pulsed, mode-locked output can be coupled out of the cavity in any suitable manner. For example, end mirror 120 can be made to be 95% reflecting and 5% transmitting.

It is believed that other methods for changing the effective paths lengths in the cavity can be used to generate mode-locked pulses. For example, a phase modulator operating a low frequency could create the same effect. This approach may be desirable for diode pumped solid state applications.

In the geometry shown in FIG. 3, the path length $L_1$, between mirror 122 and the beam splitter 126 is substantially equal to the path length $L_2$, between mirror 128 and the beam splitter. It has been found that the pulse width will be shortened as the path lengths are adjusted towards equality. However, as the path lengths approach equality, the mode-locked behavior will abruptly disappear. As the difference in the path lengths is increased, the pulse width will broaden. In the preferred embodiment, good stability and the shortest pulses can be achieved when the difference in path lengths is on the order of 10 to 100 microns.

In the geometry of FIG. 3, the lengths $L_1$ and $L_2$ are relatively short when compared to the overall path length of the cavity defined between mirrors 120 and 122. This configuration can be considered to have a short Michelson geometry. FIG. 4 illustrates an alternate design that can be considered to have a long Michelson geometry.

As in FIG. 3, the laser 210 of FIG. 4 has a primary light path defined by end mirrors 220 and 222. In addition, a beam splitter 226 is provided to redirect the light along a secondary path to mirror 228. A PZT crystal 230 is provided for varying the length of the second path.

In this embodiment, the Michelson interferometer geometry encompasses the entire resonator structure. More specifically, one leg of the interferometer is defined between the beam splitter 226 and second mirror 222. The other leg is defined between first mirror 220 and the beam splitter 226 and includes the secondary light path out to and back from mirror 228. Once again, these two legs must be substantially, but not exactly equal in length. More specifically, the path length between second mirror 222 and beam splitter 226 is substantially equal to the path length between first mirror 220 and the beam splitter 226 plus twice the distance between the beam splitter 226 and third mirror 228.

The interference effects created by this geometry can be best be appreciated by considering a single pulse travelling in the cavity from first mirror 220 and towards beam splitter 226. A portion of this pulse will pass beam splitter 226 and travel to and be reflected back from second mirror 222. The remaining portion of the pulse will be redirected up into the secondary path. The pulse will then be reflected back into the primary path towards first mirror 220. After the pulse is reflected back by the first mirror, a portion of it will again be redirected up into the secondary path by the beam splitter. When the pulse is fed back into the primary path a second time, it will reach the beam splitter at just about the same time and be travelling in the same direction as the other portion of the pulse that has been travelling out to and back from the second mirror. These two pulse portions can interferometrically recombine contributing to the mode-locked pulse performance.

It has been found that in a laser configured in accordance with this embodiment, mode-locked operation can be achieved by reciprocating any of the three end mirrors (220, 222 or 228). In contrast, in the embodiment shown in FIG. 3, it is necessary to reciprocate either mirror 128 or 122 in order to create a pulsed output. It is believed that this difference is based on the fact that in the first embodiment, the Michelson structure is short compared to the length of the cavity and the interference effects are only created in the short legs.

The right hand end of the resonator is defined by a pair of spherical mirrors, 222 and 223. The spacing and focal power of these mirrors is designed such that the light will be reflected in a manner that is optically equivalent to being reflected from a flat mirror 228 located a distance $L_3$ from beam splitter 226. This approach is used to provide optimum mode matching between the two arms of the interferometer.

It has been observed that as a result of the scanning action, a train of pulses is obtained such that the center wavelength of the spectrum changes periodically, while the spectral width of a single pulse anywhere in the train remains essentially constant. The total wavelength excursion is approximately two to three times the spectral width. The width of the time resolved spectrum at any point within the scan roughly corresponds to the width associated with Fourier Transform limited pulses.

Since the center frequency of the pulses varies with the scan of the PZT, the stability of the output can be enhanced if a feedback loop is employed. The feedback loop is shown in FIG. 3. The signal measured in the feedback loop is based upon the resulting dither of the laser output frequency as the varying loss is introduced into the cavity. This dither in frequency is expressed as a modulation in the amplitude of the output when a wavelength selecting element having a filtering action (ie. a birefringent element 150) is located in the cavity. The frequency of the modulation in the amplitude is the frequency at which the PZT is driven.

A portion of the output beam is picked off by a splitter 152 and directed to a photodetector 154. The current generated by the detector is supplied to a phase sensitive detector 156. The output of driver 132 is also supplied to detector 156 so that a discriminant signal can be generated indicative of the phase relationship between the driver 132 and the modulation in the output beam. The discriminant signal is then added to the driver signal and fed to a high voltage amplifier 160. The output of the amplifier 160 is supplied to the PZT 130 to control the average position of the mirror 128. In this manner, the relationship between the peak of the loss introduced into the cavity and transmission of the wavelength selecting element will be stabilized with respect to the timing of the scan of the loss. Stated differently, for each successive scan cycle of the mirror, the same points of the scanned loss will coincide with the same points on the transmission curve of the wavelength selecting element. This feedback loop enhances stability both in terms of pulse amplitude and spectral characteristics. Preferably, the unity gain frequency of the feed back loop must be much lower than the scanning frequency of the PZT in order to compensate for low frequency fluctuations such as drift.

A laser was operated in accordance with the lay-out shown in FIG. 3 with a gain medium 124 of titanium:-sapphire. The rod was located at a beam waist defined by mirror 140 and 142. The rod was excited with a CW pump beam from an argon ion laser 144 operating in multiline at 8 Watts. It is believed that this invention can be used with a wide variety of gain mediums, pumping schemes and power levels.

The PZT of this laser was driven by a low voltage (less than 10 volts) oscillator at frequencies between 30 and 100 KHz with a preferred frequency of around 45 KHz. Some shortening of the pulse width is observed as the frequency is increased. The beam splitter 126 was fifty percent reflective. A phase sensitive servo loop was utilized as described above. This laser generated a mode-locked output of 500 to 700 mWatts at 800 nm. The leakage through the beam splitter was less than 150 mWatts. The best pulse width obtained with good stability was below 10 picoseconds as shown on an autocorrelation trace. Amplitude noise (actually modulation) could be kept below ten percent.

The time resolved spectral width was between 0.18 and 0.25 nm. The time average spectral width was 0.4 to 0.7 nm. This performance indicates that the pulses are nearly Fourier Transform limited with a center wavelength that changes across the scan. Similar results were obtained with the laser lay-out shown in FIG. 4 with the addition of the feedback loop illustrated in FIG. 3.

FIG. 5 illustrates a different lay-out which is topographically equivalent to the lay out shown in FIG. 3. In this case, the laser 310 has a resonator with a primary light path defined between mirrors 320 and 322. A gain medium 324 is located within the resonator. In this case, the means for redirecting the light to the secondary path is the end mirror 322 itself. End mirror 322 can be made to be 50 percent reflecting and 50 percent transmitting. In this manner, a portion of the light energy will be reflected back towards mirror 320 while the remaining light will be directed into the secondary light path between mirror 322 and mirror 328. Mirror 328 functions to feedback the light into the primary light path. The light recombines at mirror 322 to create the interference necessary for the mode-locked performance. As in the previous embodiments, a PZT 330 crystal is mounted on mirror 328 for actively changing the path length of the secondary path. In this embodiment, the lengths of the primary and secondary beam paths should be substantially equal.

In summary, there has been provided a laser wherein mode-locked pulsed output is induced by introducing a varying frequency dependent loss in the cavity. The scanning of the frequency dependent loss permits a large number of longitudinal modes to oscillate with a phase relationship that allows the build-up of short light pulses. In one of the preferred embodiments of the subject invention, the varying frequency dependent loss is generated by reciprocating one of the mirrors of the resonator. In this embodiment, the laser has a resonator with a primary light path defined by first and second end mirrors. A gain medium is located between the end mirrors. A beam splitter is provided for redirecting the light into a secondary light path. A third mirror functions to feed back the light into the primary light path. Pulse formation is induced by varying the path length of one of the two paths by reciprocating an end mirror. Moving the mirror creates varying interference effects when the light energy is recombined at the beam splitter. The mirror is reciprocated relatively slowly, yet short pulses, in the picosecond regime, are generated.

While the subject invention has been described with reference to preferred embodiments, other changes and modifications could be made therein by one skilled in the art without varying from the scope and spirit of the invention as defined by the appended claims.

We claim:
1. A mode-locked laser comprising:
   a resonant cavity;
   a gain medium located within said cavity;
   means for introducing a varying, frequency dependant loss in the cavity in order to generate mode-locked pulses.
2. A laser as recited in claim 1 wherein said means for introducing a loss in the cavity functions to scan said loss across the oscillating longitudinal modes in said cavity at a frequency between 1 KHz and 1 MHz to generate pulses having a duration at least as short as in the picosecond range.
3. A laser as recited in claim 2 wherein the means for introducing a loss in the cavity is an adjustable etalon.
4. A laser as recited in claim 2 wherein said means for introducing a loss in the cavity includes changing the length of the resonant cavity.
5. A laser as recited in claim 4 wherein the length of the cavity is varied an amount less than 0.5 times the wavelength of the light being generated.
6. A laser as recited in claim 2 wherein said resonant cavity includes a primary light path bounded by a at least a first and second mirror and further comprising:
   means for redirecting a portion of the laser light out of the primary light path and into a secondary light path;
   a third mirror for feeding back said redirected light back into said primary light path; and
   wherein said means for introducing a loss in the cavity is defined by a means for changing the path length of one of said light paths to generate mode-locked pulses.

7. A laser as recited in claim 6 wherein said means for changing the path length is defined by a means for reciprocating one of said mirrors.

8. A laser as recited in claim 7 where said light is coupled back into said primary light path through said redirecting means.

9. A laser as recited in claim 8 wherein said means for redirecting said laser light is defined by a partially transmissive mirror and wherein said partially transmissive mirror, said second mirror and said third mirror are oriented in a manner to define a Michelson interferometer.

10. A laser as recited in claim 9 wherein the path length between said second mirror and said partially transmissive mirror is substantially, but not exactly equal to the path length between said third mirror and said partially transmissive mirror and wherein said path lengths are small compared to the size of said resonant cavity.

11. A laser as recited in claim 9 wherein the path length between the second mirror and said partially transmissive mirror is substantially, but not exactly equal to the path length between the first mirror and the partially transmissive mirror plus twice the path length between the partially transmissive mirror and the third mirror.

12. A laser as recited in claim 7 wherein said one mirror is reciprocated with a period that is much greater than the round trip time of laser light within said cavity to generate mode-locked pulses having a duration at least as short as in the picosecond range.

13. A laser as recited in claim 7 wherein said one mirror is reciprocated at a frequency between 1 KHz and 1 MHz to generate mode-locked pulses having a duration at least as short as in the picosecond range.

14. A laser as recited in claim 7 wherein said length of travel of said one mirror is less than 0.25 times the wavelength of laser light being generated.

15. A laser as recited in claim 7 wherein the center wavelength of the frequency spectrum of said mode-locked pulses varies as a result of said varying loss and further comprising:
    means in said cavity for providing wavelength discrimination;
    means for detecting variations in the modulation of the amplitude of the output of the laser based upon the variations in the frequency spectrum of said mode-locked pulses;
    means for detecting the phase difference between the variations in the amplitude and reciprocation of said one mirror and generating a discriminant signal and using said discriminant signal to adjust the average position of said mirror to stabilize the mode-locked pulses.

16. A laser as recited in claim 1 wherein said gain medium is pumped by a CW source.

17. A laser as recited in claim 1 wherein the center wavelength of the frequency spectrum of said mode-locked pulses varies as a result of, said varying loss and further comprising:
    means for detecting said wavelength variation; and
    means for maintaining a fixed phase relationship between said varying loss and said wavelength variation.

18. A laser as recited in claim 17 wherein said means for detecting said wavelength variation comprises:
    means in said cavity providing wavelength discrimination; and;
    means for detecting variations in the modulation of the amplitude of the output of the laser based upon the variations in the frequency spectrum of said mode-locked pulses.

19. A laser as recited in claim 18 further including a means for detecting the phase difference between said varying loss and the variations in amplitude and generating a discriminant signal to stabilize the mode-locked pulses.

20. A method of generating mode-locked pulses from a laser having a resonant cavity, said method comprising the step of:
    introducing a varying, frequency dependant loss in the cavity in order to generate mode-locked pulses.

21. A method as recited in claim 20 wherein said loss is scanned across the oscillating longitudinal modes in said cavity at a frequency between 1 KHz and 1 MHz to generate pulses having a duration at least as short as in the picosecond range.

22. A method as recited in claim 21 wherein said loss is introduced by changing the length of the resonator.

23. A method as recited in claim 22 wherein the length of the cavity is varied an amount less that 0.5 times the wavelength of the light being generated.

24. A method as recited in claim 20 wherein the center wavelength of the frequency spectrum of said mode-locked pulses varies as a result of said varying loss and further comprising the steps of:
    detecting said wavelength variations; and
    maintaining a fixed phase relationship between said varying loss and said wavelength variation.

25. A mode-locked laser comprising:
    a resonant cavity having a primary light path bounded by at least a first and second mirror;
    a gain medium located within said cavity;
    means for redirecting a portion of the laser light out of the primary light path and into a secondary light path;
    a third mirror for feeding back said redirected light back into said primary light path; and
    means for changing, the path length of one of said light paths to generate mode-locked laser pulses.

26. A laser as recited in claim 25 wherein said means for changing the path length is defined by a means for reciprocating one of said mirrors.

27. A laser as recited in claim 26 where said light is coupled back into said primary light path through said redirecting means.

28. A laser as recited in claim 27 wherein said means for redirecting said laser light is defined by a partially transmissive mirror and wherein said partially transmissive mirror, said second mirror and said third mirror are oriented in a manner to define a Michelson interferometer.

29. A laser as recited in claim 28 wherein the path length between said second mirror and said partially transmissive mirror is substantially, but not exactly equal to the path length between said third mirror and said partially transmissive mirror and wherein said path lengths are small compared to the size of said resonant cavity.

30. A laser as recited in claim 28 wherein the path length between the second mirror and said partially transmissive mirror is substantially, but not exactly equal to the path length between the first mirror and the partially transmissive mirror plus twice the path length between the partially transmissive mirror and the third mirror.

31. A laser as recited in claim 26 wherein said one mirror is reciprocated with a period that is much greater than the round trip time of laser light within said cavity to generate mode-locked pulses having a duration at least as short as in the picosecond range.

32. A laser as recited in claim 26 wherein said one mirror is reciprocated at a frequency between 1 KHz and 1 MHz to generate mode-locked pulses having a duration at least as short as in the picosecond range.

33. A laser as recited in claim 26 wherein said length of travel of said one mirror is less than 0.25 times the wavelength of laser light being generated.

34. A laser as recited in claim 26 wherein the center wavelength of the frequency spectrum of said mode-locked pulses varies as a result of said varying loss and further comprising:
  means in said cavity for providing wavelength discrimination;
  means for detecting variations in the modulation of the amplitude of the output of the laser based upon the variations in the frequency spectrum of said mode-locked pulses;
  means for detecting the phase difference between the variations in the amplitude and reciprocation of said one mirror and generating a discriminant signal and using said discriminant signal to adjust the average position of said mirror to stabilize the mode-locked pulses.

35. A laser as recited in claim 25 wherein said gain medium is pumped by a CW source.

36. A method of generating mode-locked pulses from a laser having a resonant cavity with a primary light path bounded by at least first and second mirrors, said method comprising the steps of:
  redirecting a portion of the laser light out of said primary path into a secondary path;
  feeding back said redirected light into said primary path; and
  changing the length of one of said paths to generate mode-locked pulses.

37. A method as recited in claim 36 wherein said light is feed back into said primary path by a third mirror and wherein said step of changing the length of one of said paths is performed by reciprocating one of said mirrors.

38. A method as recited in claim 37 wherein said one mirror is reciprocated with a period that is much greater than the round trip time of laser light within said cavity to generate mode-locked pulses at least as short as in the picosecond regime.

39. A method as recited in claim 37 wherein said one mirror is reciprocated at a frequency between 1 KHz and 1 MHz to generate mode-locked pulses having a duration at least as short as in the picosecond range.

40. A method as recited in claim 37 wherein the length of travel of said one mirror is at least 0.205 times the wavelength of laser light being generated.

41. A method as recited in claim 37 wherein the center wavelength of the frequency spectrum of said mode-locked pulses varies as a result of said reciprocation of said mirror further comprising the steps of:
  detecting said wavelength variations; and
  detecting the phase difference between the variations in said wavelength with the reciprocation of said mirror and generating a discriminant signal and using said discriminate signal to adjust the average position of said mirror to stabilize the mode-locked pulses

* * * * *